(12) United States Patent
Estruch Tena et al.

(10) Patent No.: US 10,854,169 B2
(45) Date of Patent: Dec. 1, 2020

(54) SYSTEMS AND METHODS FOR VIRTUAL DISPLAYS IN VIRTUAL, MIXED, AND AUGMENTED REALITY

(71) Applicant: Samsung Electronics Co., Ltd., Suwon-si (KR)

(72) Inventors: Marc Estruch Tena, San Jose, CA (US); Philipp Schoessler, Los Gatos, CA (US); Link Huang, San Jose, CA (US); Dane Mason, San Fransisco, CA (US); Sergio Perdices-Gonzalez, Sunnyvale, CA (US); Brian Harms, San Jose, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/271,601

(22) Filed: Feb. 8, 2019

(65) Prior Publication Data
US 2020/0193938 A1 Jun. 18, 2020

Related U.S. Application Data

(60) Provisional application No. 62/779,678, filed on Dec. 14, 2018.

(51) Int. Cl.
*G09G 5/14* (2006.01)
*G06F 3/01* (2006.01)
*G02B 27/01* (2006.01)

(52) U.S. Cl.
CPC ............ *G09G 5/14* (2013.01); *G02B 27/0172* (2013.01); *G06F 3/011* (2013.01); *G06F 3/017* (2013.01);
(Continued)

(58) Field of Classification Search
CPC .. G09G 5/14; G09G 2354/00; G02B 27/0172; G02B 2027/0134; G02B 2027/014; G06F 3/017; G06F 3/011
See application file for complete search history.

(56) References Cited

U.S. PATENT DOCUMENTS

2002/0180809 A1 12/2002 Light et al.
2011/0169928 A1 7/2011 Gassel et al.
(Continued)

FOREIGN PATENT DOCUMENTS

CN 106984046 A 7/2017
JP 1997179062 A 7/1997
(Continued)

OTHER PUBLICATIONS

European Search Report dated May 15, 2020 in connection with European Patent Application No. 19 21 6254, 9 pages.
(Continued)

*Primary Examiner* — Andrew Sasinowski

(57) ABSTRACT

The present disclosure includes methods and devices for generation and control of virtual displays in a virtual environment. A method includes receiving a trigger input from a user of a computing device, the computing device including a physical display that displays first content, initiating at least one virtual display based on the trigger input from the user, providing the at least one virtual display in association with the physical display, and displaying second content via the at least one virtual display in association with the first content displayed via the physical display.

20 Claims, 15 Drawing Sheets

(52) U.S. Cl.
CPC .......... *G02B 2027/014* (2013.01); *G02B 2027/0134* (2013.01); *G09G 2354/00* (2013.01)

(56) References Cited

U.S. PATENT DOCUMENTS

| | | |
|---|---|---|
| 2013/0187835 A1 | 7/2013 | Vaught et al. |
| 2015/0205106 A1 | 7/2015 | Norden |
| 2016/0154457 A1* | 6/2016 | Osaragi .......... G06F 3/011 345/179 |
| 2016/0163063 A1 | 6/2016 | Ashman |
| 2016/0313800 A1 | 10/2016 | Noda et al. |
| 2017/0076498 A1 | 3/2017 | Dakss et al. |
| 2017/0076502 A1 | 3/2017 | Chen et al. |
| 2017/0336941 A1 | 11/2017 | Gribetz |
| 2018/0061128 A1 | 3/2018 | Cabanier et al. |
| 2018/0173323 A1* | 6/2018 | Harvey .......... G06F 3/011 |
| 2018/0181194 A1 | 6/2018 | Harvey et al. |
| 2018/0190324 A1 | 7/2018 | Paul et al. |
| 2018/0286352 A1 | 10/2018 | Yao et al. |

FOREIGN PATENT DOCUMENTS

| | | |
|---|---|---|
| JP | 2012233963 A | 11/2012 |
| KR | 10-2012-0086266 A | 8/2012 |
| KR | 1020150054825 A | 5/2015 |
| KR | 101897789 B1 | 9/2018 |
| WO | 2016/118606 A1 | 7/2016 |

OTHER PUBLICATIONS

Notification of Transmittal of the International Search Report and the Written Opinion of the International Searching Authority, or the Declaration dated Mar. 24, 2020, in connection with International Patent Application No. PCT/KR2019/017689, 10 pages.

* cited by examiner

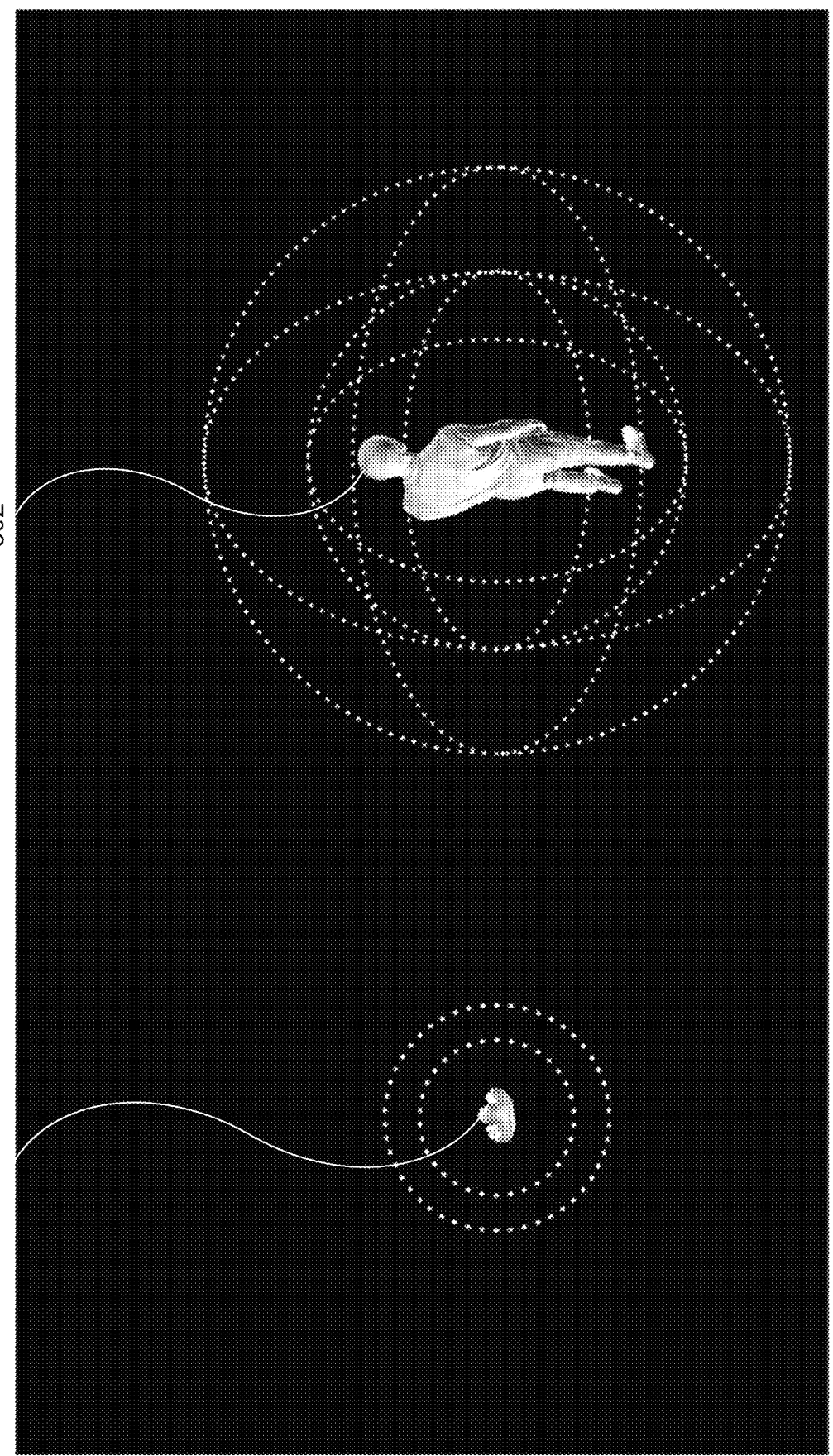

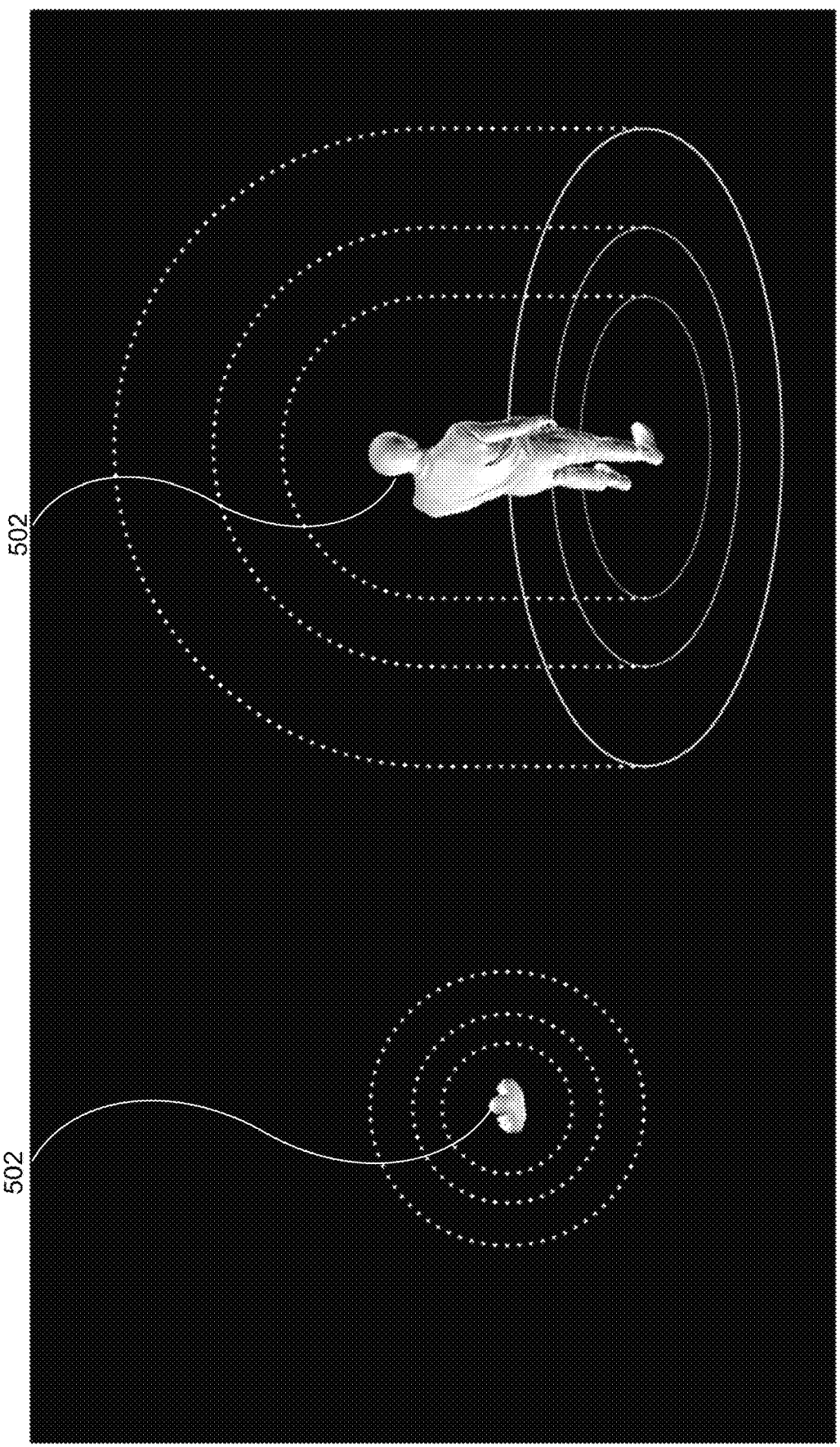

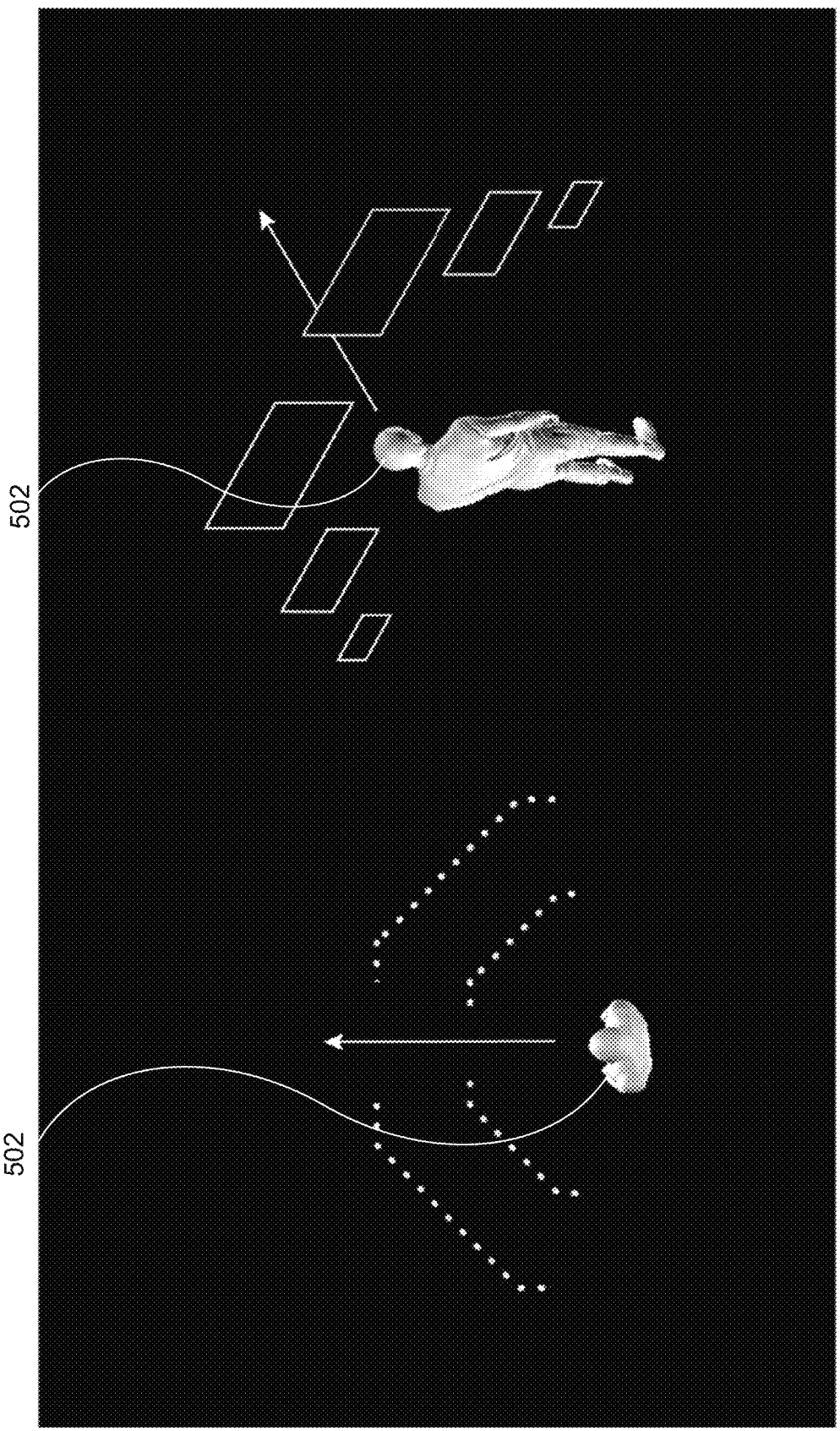

SYSTEMS AND METHODS FOR VIRTUAL DISPLAYS IN VIRTUAL, MIXED, AND AUGMENTED REALITY

CROSS-REFERENCE TO RELATED APPLICATION(S) AND CLAIM OF PRIORITY

This application claims priority under 35 U.S.C. § 119(e) to U.S. Provisional Patent Application No. 62/779,678 filed on Dec. 14, 2018. The above-identified provisional patent application is hereby incorporated by reference in its entirety.

TECHNICAL FIELD

This disclosure relates generally to virtual environments, including virtual reality (VR) environments and augmented reality (AR) environments. More specifically, this disclosure relates to systems and methods for control of virtual displays in a virtual environment.

BACKGROUND

Virtual reality (VR) and augmented reality (AR) headsets, or head mountable devices (HMDs) are increasingly common, and user interfaces for VR and AR headsets present unique opportunities for productivity. Traditional computer-based productivity workstations have a finite and relatively small amount of screen real estate on which to display and interact with productivity software. VR and AR headsets allow for a potential display area that is much larger than that provided by standard computer displays.

SUMMARY

Embodiments of the present disclosure provide systems and methods for control of virtual displays in a virtual environment.

In one embodiment, a method is disclosed. The method includes receiving a trigger input from a user of a computing device, the computing device including a physical display that displays first content, initiating at least one virtual display based on the trigger input from the user, providing the at least one virtual display in association with the physical display, and displaying second content via the at least one virtual display in association with the first content displayed via the physical display.

In a second embodiment, a head mountable device (HMD) is disclosed. The HMD comprises a display and a processor operatively coupled to the display. The processor is configured to receive a trigger input from a user of a computing device, the computing device including a physical display that displays first content, initiate at least one virtual display based on the trigger input from the user, provide, with the display, the at least one virtual display in association with the physical display, and display, with the display, second content via the at least one virtual display in association with the first content displayed via the physical display.

In a third embodiment, a non-transitory computer-readable medium embodying a computer program is disclosed. The computer program comprises computer readable program code that, when executed, causes at least one processor to receive a trigger input from a user of a computing device, the computing device including a physical display that displays first content, initiate at least one virtual display based on the trigger input from the user, provide, with the display, the at least one virtual display in association with the physical display, and display, with the display, second content via the at least one virtual display in association with the first content displayed via the physical display.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 5A, 5B, 6A, 6B, 7A, 7B, 8A, 8B, 9A, 9B, 10A, 10B, 11A, 11B, 12, 13A, and 13B illustrate example positioning arrangements of virtual displays in accordance with various embodiments of the present disclosure;

DETAILED DESCRIPTION

Figure 1:
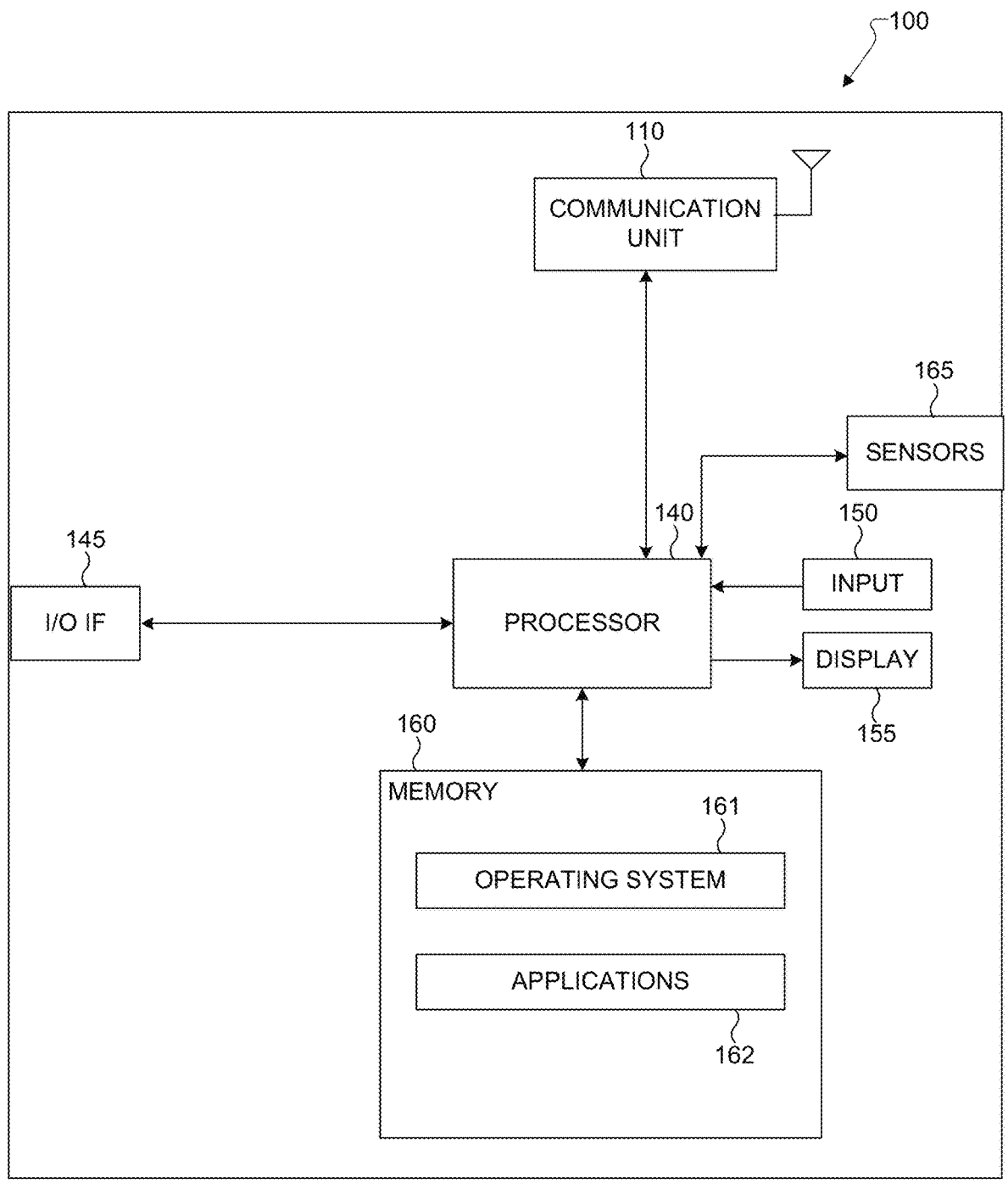
FIG. 1 illustrates an example HMD that is capable of facilitating a virtual environment according to this disclosure.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that productivity tasks such as word processing, spreadsheet management, internet research, and the like are limited by screen real estate on physical computers. It is increasingly common for office workers to use two, three, or even more monitors to increase the available screen real estate available for productivity tasks. Additional monitors are expensive and require additional physical space at a work station. Screen real estate can also be a limiting factor in recreational tasks such as internet shopping, playing video games, and the like.

Virtual reality (VR) and augmented reality (AR) head mounted (or mountable) devices (HMDs) provide the possibility of turning all 360 degrees around a user, at any distance, into potential "screen" space for productivity or recreation. For convenience, the environment generated by both VR and AR devices will be referred to as a virtual environment below. Any number of screens of any size can be generated and displayed in the virtual environment at varying depths relative to the user.

Two dimensional (2D) and three dimensional (3D) content can also be combined in unique ways in the virtual environment. The 3D content can be content that conveys depth perception to the viewer by employing techniques such as stereoscopic display, multi-view display, 2D-plus-depth, or any other form of 3D display. Rather than rendering a 3D object within a 2D screen, a 3D object can be rendered within the virtual environment such that a user can interact with it in 3D space. This can allow for increased productivity by, for example, allowing an architect or engineer to review a 3D model of a project in the virtual environment. This also allows for improved recreational activities, such as shopping, by allowing a user to review a 3D model of a product that they are shopping for, and potentially allowing them to interact with the object to test it before buying.

VR and AR HMDs also facilitate the use of novel control schemes for tasks in the virtual environment. For example, embodiments of this disclosure contemplate that a creative task involving drawing can be performed in a virtual environment by displaying a task window such that it appears to be resting on a work space in front of a user, and allowing the user to draw in the task window by drawing on the work space with a stylus or other tool. This removes the need for specialized drawing tablet hardware that is typically used for such creative tasks. Any virtually augmented physical surface inertly provides certain haptic feedback, which makes it easier to interact with virtually augmented physical elements as compared to mid-air elements, similar to how touch sensitive tablets afford very precise touch interactions as compared to mid-air gestures. As another example, a mobile device (such as a smart phone) or other device could be used as an input tool to control windows or objects in the virtual space. A user input on the mobile device can be used to control tasks in the virtual space, and can also be combined with information displayed on the mobile device. For example, buttons or commands could be displayed on the mobile device, and actuation of a button or command could control tasks in the virtual environment. In another example, the location of the mobile device could itself be used to control tasks in the virtual environment, such as by shifting which task window out of multiple task windows is active based on a location on a workspace where a mobile device (or other object) is placed.

In some embodiments, the virtual environment can be used to extend the functionality of a physical display in the physical environment. For example, a user could view a physical display through an AR or VR HMD, and the HMD could generate additional task windows that appear to the user as an extension of the physical display. Similarly, the display of another device such as a smart phone could be extended. For example, when a smart phone has a series of home pages or applications that can be navigated through by swiping to the side, the HMD could display these screens within the virtual environment as an extension of the display of the smart phone so that the user can see what they are navigating to before swiping. In this manner, a user could, for example, open a video in a video application, then move to another application and still display the video within the virtual environment. Alternatively, when a smart phone attempts to display an object that is larger than the display of the smart phone, virtual displays could be used to extend the size of the display in order to display the object.

FIG. 1 illustrates an example HMD 100 that is capable of facilitating a virtual environment according to this disclosure. For example, the HMD 100 could represent a virtual reality (VR) headset or a mobile phone designed to be combined with a virtual reality accessory, such as a headset. The HMD 100 could also represent an augmented reality (AR) headset, which includes a transparent display through which a physical environment can be viewed while additional elements are displayed as a virtual overlay on the physical environment.

As shown in FIG. 1, the HMD 100 includes a communication unit 110 that may include, for example, a radio frequency (RF) transceiver, a BLUETOOTH® transceiver, or a WI-FI® transceiver. The HMD 100 also includes a processor 140, an input/output (I/O) interface (IF) 145, an input interface 150, a display 155, a memory 160, and sensors 165. The memory 160 includes an operating system (OS) program 161 and one or more applications 162. In some embodiments, the HMD 100 also functions as a mobile phone.

The communication unit 110 may receive an incoming RF signal such as a BLUETOOTH® or WI-FI® signal. This incoming RF signal could come from another electronic device, such as a mobile device. The communication unit 110 may down-convert the incoming RF signal to generate an intermediate frequency (IF) or baseband signal, then generate a processed baseband signal by filtering, decoding, and/or digitizing the baseband or IF signal. The communication unit 110 transmits the processed baseband signal to the processor 140 for further processing (such as for web browsing data, online gameplay data, notification data, or other message data).

The communication unit 110 also receives analog or digital voice data or other outgoing baseband data (such as web data, e-mail, or interactive video game data) from the processor 140. The communication unit 110 encodes, multiplexes, and/or digitizes the outgoing baseband data to generate a processed baseband or IF signal. In the case that the communication unit 110 is an RF transceiver, the communication unit 110 up-converts the baseband or IF signal to an RF signal that is transmitted via an antenna.

The processor 140 can include one or more processors or other processing devices and execute the OS 161 stored in the memory 160 in order to control the overall operation of the HMD 100. For example, the processor 140 could control the reception of forward channel signals and the transmission of reverse channel signals by the communication unit 110 in accordance with well-known principles. In some embodiments, the processor 140 includes at least one microprocessor or microcontroller.

The processor 140 is also capable of executing other processes and programs resident in the memory 160. The processor 140 can move data into or out of the memory 160 as required by an executing process. In some embodiments, the processor 140 is configured to execute the applications 162 based on the OS 161 or in response to signals received from sensors 165 or an input of commands from a user via input interface 150. The processor 140 is also coupled to the I/O interface 145, which provides the HMD 100 with the ability to connect to other devices such as laptop computers and handheld computers. The I/O interface 145 is the communication path between these accessories and the processor 140.

The processor 140 is also coupled to the input interface 150 and the display 155. The user of the HMD 100 can use the input interface 150 to enter data into the HMD 100. The input interface 150 may further include buttons, switches, a microphone, or the like that allow input of commands to the HMD 100. The display 155 may be a liquid crystal display, light emitting diode (LED) display, organic light emitting diode (OLED) display, or other display capable of rendering a virtual environment, including rendering text and/or graphics in the virtual environment, such as application windows.

The memory 160 is coupled to the processor 140. Part of the memory 160 could include a random access memory (RAM), and another part of the memory 160 could include a Flash memory or other read-only memory (ROM).

The sensors 165 detect information external to the HMD 100 and relay it to the processor 140 for further processing. For example, the sensors 165 may include accelerometers, gyroscopes, magnetometers, cameras, or the like to detect motion of the device (e.g., inertial measurement unit (IMU)). The sensors 165 may also include gaze tracking sensors that detect where a user of the HMD 100 is looking (i.e., what the user's eyes are directed towards) within a viewable area of the display 155. In some embodiments, these sensors 165 allow the processor 140 to provide an immersive, simulated virtual environment through the display 155 by providing the illusion of motion to the user based on sensed head and eye movements. The sensors 165 may also be used to facilitate control of virtual displays, for example by interpreting inputs such as gestures using image processing, or interpreting voice commands from a user.

Although FIG. 1 illustrates an example of an HMD, various changes may be made to FIG. 1. For example, various components in FIG. 1 could be combined, further subdivided, or omitted and additional components could be added according to particular needs. As a particular example, the processor 140 could be divided into multiple processors, such as one or more central processing units (CPUs) and one or more graphics processing units (GPUs). In addition, as with computing and communication networks, electronic devices and computer systems can come in a wide variety of configurations, and FIG. 1 does not limit this disclosure to any particular HMD.

Figure 2:
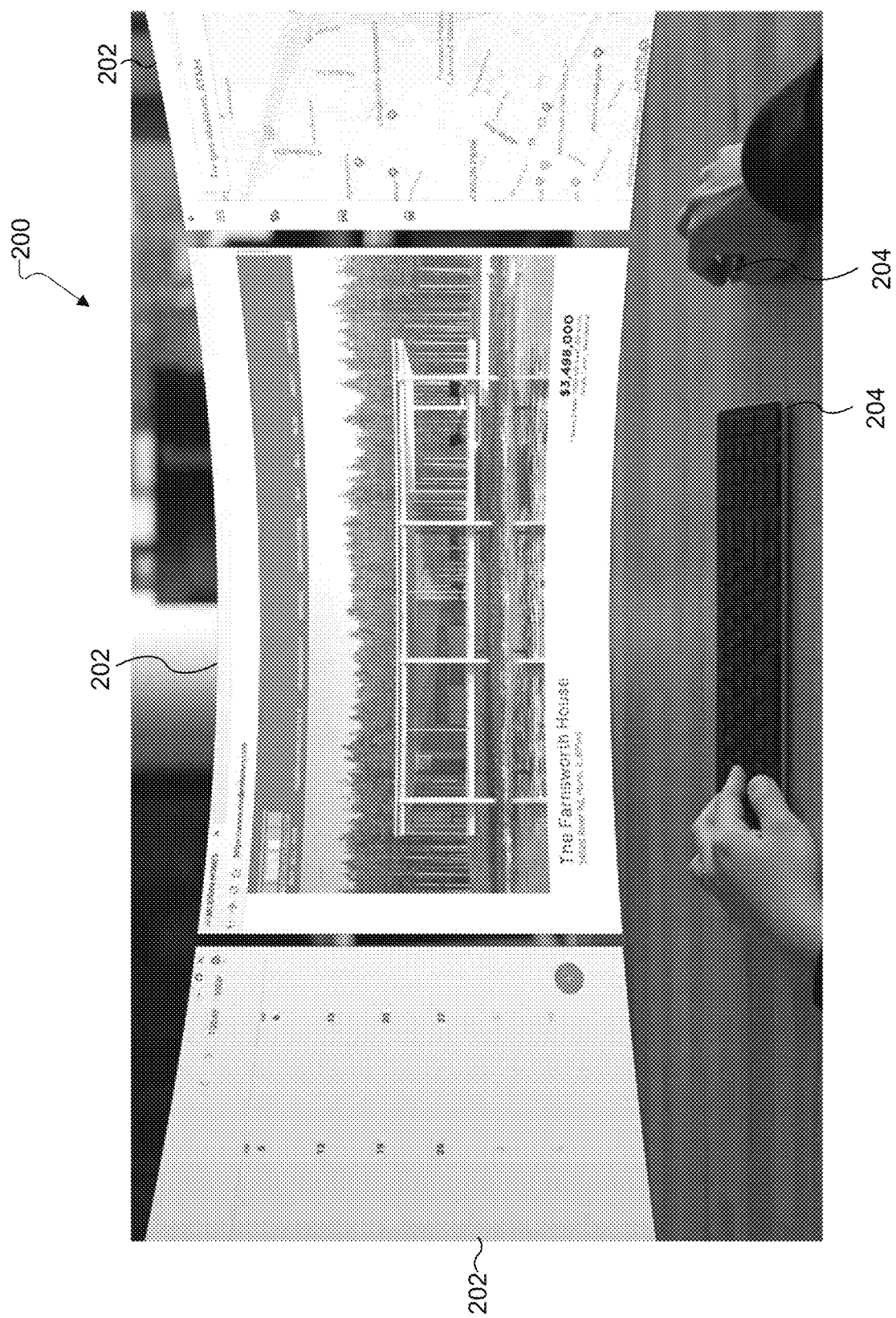
FIG. 2 illustrates an example virtual environment of the HMD according to illustrative embodiments of the present disclosure.

FIG. 2 illustrates an example virtual environment 200 of the HMD 100 according to illustrative embodiments of the present disclosure. It should be noted that the illustration shown in FIG. 2 and subsequent figures is related to the perception of a user. In some implementations, the aspects shown on the display 155 may be shown monoscopically or non-stereoscopically. In some implementations, the aspects shown on the display 155 may be shown stereoscopically (e.g., an image shown to a user's left eye and an image shown to a user's right eye, but perceived as a single image by the user). In an embodiment where the HMD 100 is a VR HMD, the virtual environment 200 can be generated by, for example, display 155 or processor 140 of the HMD 100, and can include a representation of the physical environment that is in front of the user (which can be seen by at least one camera of the HMD 100). In an embodiment where the HMD 100 is an AR HMD, the virtual environment 200 is an overlay on the physical environment that is viewable through the lens of the HMD 100. The overlaid virtual environment can be generated by, for example, display 155 or processor 140 of the HMD 100.

One or more virtual displays, or virtual displays, 202 are generated and displayed in the virtual environment 200. In this embodiment, a center virtual display 202 is oriented directly in front on the user, in a traditional workstation placement. Additional left and right virtual displays 202 are partially visible to the user while facing forward, and provide additional virtual screen space that the user can access by simply turning their head left or right. In some embodiments, additional virtual displays 202 could be positioned above one or more of the virtual displays 202 that are illustrated in FIG. 2. Similarly, additional virtual displays 202 could be positioned at different depths relative to the virtual displays 202 that are illustrated in FIG. 2—for example, behind the illustrated virtual displays 202. An arbitrary number of virtual displays 202 can be generated and displayed by the HMD 100.

In some embodiments, a user interfaces with the virtual displays 202 using hardware interface devices 204. In this embodiment, the hardware interface devices 204 include a mouse and keyboard, allowing the virtual displays 202 to function like a traditional workstation with expanded display space. The user can use the hardware interface devices 204 both to interface with applications within a virtual display 202 as well as to manipulate the virtual displays 202 themselves (for example, by manipulating the location of the virtual displays 202, or by choosing which virtual display 202 to focus on for interaction). As will be discussed further below, different interface options are available.

Figure 3:
FIG. 3 illustrates another example virtual environment of the HMD according to illustrative embodiments of the present disclosure.

FIG. 3 illustrates an example virtual environment 300 of the HMD 100 according to illustrative embodiments of the present disclosure. In some embodiments, the virtual environment 300 is the same as the virtual environment 200, wherein the user has changed their head position and thus changed the portion of the virtual environment 200 that is being viewed with the HMD 100.

An additional electronic device 302, which is separate from the HMD 100, is viewable within the virtual environment 300. In this embodiment, the electronic device 302 is a mobile device, such as a smart phone, and has its own physical display 304. Information that is displayed on the physical display 304 can be viewed within the virtual environment 300 without modification.

In this embodiment, virtual displays 306 are generated by the HMD 100, in a similar manner to virtual displays 202 of FIG. 2, and are displayed within the virtual environment 300. The virtual displays 306 are associated with the electronic device 302. The virtual displays 306 function as additional display space for the electronic device 302. For example, mobile devices often have multiple "home screens" that can be navigated through by swiping left or right. The virtual displays 306 can function to display the content of these home screens in conjunction with the physical display 304 of the electronic device 302 so that a user can get a view or preview of what is contained in these screens, and see which screen they wish to navigate to. In another example, the virtual displays 306 could contain data of applications that are executed in the background by the electronic device 302 for multitasking purposes, or could contain data of multiple screens related to one application.

In some embodiments, the virtual displays 306 could function to extend the physical display 304 such that one piece of content (or one set of content) can be displayed across both the physical display 304 and one or more of the virtual displays 306. For example, a single large object could be displayed partially on physical display 304 and partially on at least one virtual display 306 while seamlessly appearing to appear on one display to the user. In some instances, at least one virtual display 306 can be provided to appear to partially or wholly cover one or more bezels associated with the physical display 304.

In some embodiments, the user interfaces with the virtual displays 306 using the electronic device 302 as an input device. For example, the user can swipe on the physical display 304, which can be a touch screen display, in order to "move" data from an adjoining virtual display 306 onto the physical display 304, where the user can directly interact with it as they would normally on a mobile device. In other embodiments, the user can perform inputs on the physical display 304 that directly interface with content on the virtual displays 306.

In some embodiments, the user triggers the display of the virtual displays 306 via an input to the electronic device 302. For example, the user could make an input via the display 304, via a hardware gesture (such as a wrist flick that actuates an accelerometer, a gyroscope, and/or another movement/orientation sensor in the electronic device 302), or using a hardware button on the electronic device 302, and the input could trigger display of the virtual displays 306 by the HMD 100. In another embodiment, the user could make an input via the HMD 100, either by pressing a physical button on the HMD 100 or via another interface method (e.g., a gesture, a voice instruction, an input via a separate hardware interface device such as a remote control, a keyboard, or the like), and the input could trigger display of the virtual displays 306 by the HMD 100.

The location of the electronic device 302 within the virtual environment 300 can also be used to trigger various functions, including functions related to the display of the virtual displays 306, other functions of the HMD 100, or functions of the electronic device 302. For example, if the electronic device 302 is lying flat on a surface within the virtual environment 300, the HMD 100 may send an indication to the electronic device 302 to enter a do not disturb (DND) mode. Alternatively, if the electronic device 302 is within a certain predetermined area of the surface, the HMD 100 can send the indication to the electronic device 302 to enter the DND mode, and if the electronic device 302 is moved outside of the predetermined area of the workspace surface, the HMD 100 can send an indication to the electronic device 302 to exit the DND mode. In another embodiment, if the electronic device 302 is within a predetermined area of the surface, or is propped up at an angle relative to the surface, the HMD 100 may determine to display virtual displays 306 associated with the electronic device 302 within the virtual environment 300, or the HMD 100 may determine to display virtual displays in the style of virtual displays 202 of FIG. 2, thereby creating an interface similar to a standard workstation for the electronic device 302.

In some embodiments, the data that is displayed on virtual displays 306 is generated by the electronic device 302 and provided to the HMD 100 for display within the virtual environment 300 on the virtual displays 306. The electronic device 302 could provide raw data to be displayed to the HMD 100, allowing the HMD 100 to process the data into a display-ready format, or it could provide fully generated display information that the HMD 100 simply displays within the virtual environment 300. In other embodiments, the HMD 100 can itself generate information for display in the virtual displays 306, and relevant data can be supplied by the HMD 100 to the electronic device 302 for display on the physical display 304 if the user chooses to move that data from a virtual display 306 onto the physical display 304.

Figure 4:
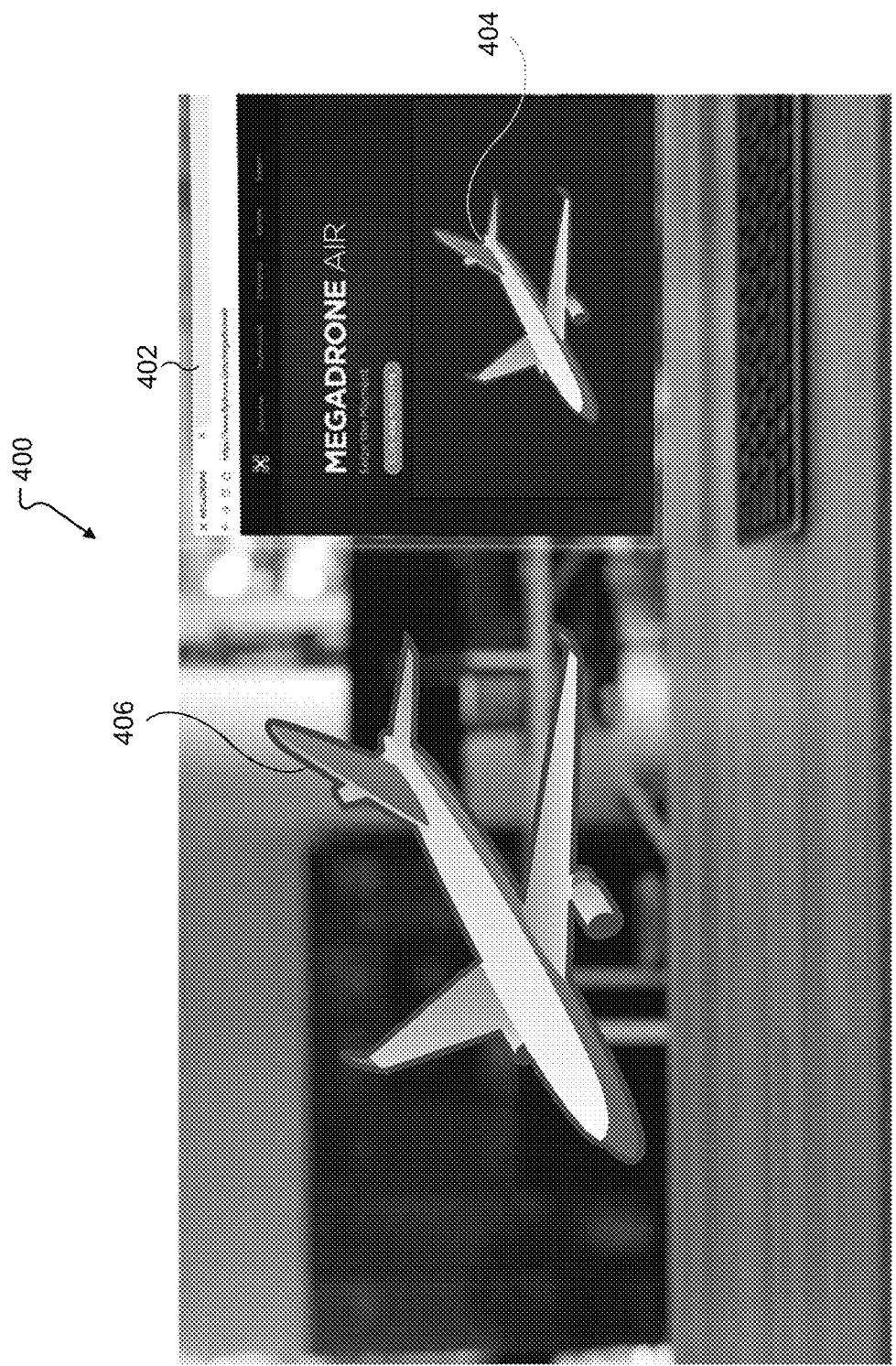
FIG. 4 illustrates another example virtual environment of the HMD according to illustrative embodiments of the present disclosure.

FIG. 4 illustrates an example virtual environment 400 of the HMD 100 according to illustrative embodiments of the present disclosure. In some embodiments, the virtual environment 400 is the same as the virtual environments 200 or 300, with a focus on a portion of the virtual environment that contains a virtual display 402 and a space in the environment adjacent to the virtual display 402. It is understood that any suitable electronic device could perform at least some portion of the functions of the HMD 100 described below.

In this embodiment, the HMD 100 displays a hybrid of 2D and 3D images in the virtual environment 400. For example, a virtual display 402 displays a product website that contains information about a product 404. This virtual display 402 appears as a 2D window to the user. The HMD 100 also displays, adjacent to the virtual display 402, a 3D model 406 of the product 404. This 3D model can be manipulated by the user to view the product 404. In some embodiments, the HMD 100 can additionally provide a virtual "test drive" of the product 404, allowing the user to interact with the 3D model 406 to test features of the product 404.

In some embodiments, the HMD 100 automatically determines, upon displaying a product 404 within the virtual display 402, that it should generate and display the 3D model 406. In other embodiments, the HMD 100 receives an input (e.g., from a user or from the source of the data displayed in the virtual display 402, which could be a website or an application) that prompts generation and display of the 3D model 406. In some embodiments the source of the product 404 displayed in the virtual display 402 (e.g., a website host) can provide the data for generating the 3D model 406, and in other embodiments the HMD 100 can generate the 3D model, for example based on image recognition of the product 404. After determining to display the 3D model 406, the HMD can then determine whether there is space adjacent to the virtual display 402 where the 3D model 406 can be displayed in the virtual environment 400 without interfering with other displayed content. The HMD 100 could further determine to move other displayed content, such as other virtual displays 402, in order to create space to display the 3D model 406.

In some embodiments, the virtual display 402, which is a 2D window, could transform into a 3D scene rather than a single 3D model 406, immersing the user into a different world. The 2D window could disappear during the immersive experience or still be present, depending on context. For example, a real estate website could offer virtual house tours on their website, wherein a user starts by scrolling through 2D content and information on a virtual display 402, then transitions into a 3D model of a house that occupies the environment around the user, and lastly transitions back to 2D content. Such embodiments provide a seamless mix between classical 2D and 3D information.

In some embodiments, the 3D model 406 could be associated with a computer-aided design (CAD) program, and the product 404 could be a CAD model. In such an embodiment, the user can manipulate the product 404 using CAD software, and changes to the model can be reflected in the 3D model 406 in real time, allowing the user to get a better view of the task.

While the above embodiments describe displaying 2D content in a virtual display 402, hybrid arrangements incorporating a physical display can also be used with these embodiments. For example, the virtual display 402 could be replaced with a physical display in any of the above embodiments, where the physical display is viewable by the user within the virtual environment 400. The HMD 100 could provide the 3D model 406 in a space within the virtual environment adjacent to the location of the physical display, thereby providing the same functionality described above for the 3D model 406. In such an embodiment, the HMD 100 could communicate with another electronic device that is controlling the physical display, or the HMD 100 itself could also control the physical display.

FIGS. 5A-13B illustrate example positioning arrangements of virtual displays in accordance with various embodiments of the present disclosure. These positioning arrangements are examples of preset formations for arrangement of a plurality of virtual displays within a virtual environment by an HMD 100 in order to organize the plurality of virtual displays in various useful layouts. A virtual display can be provided at each of the example dots or points in each example positioning arrangement. In some embodiments, the HMD 100 can automatically choose one of these positioning arrangements based on various factors, such as the user's location, the physical environment that is within the user's field of view, or whether the user is moving, standing, or sitting. In other embodiments, the user can manually choose which positioning arrangement to use. In some embodiments, the user can adjust windows (i.e., virtual displays) within the positioning arrangement, or deviate from the positioning arrangement by moving a window to a position that does not align with the positioning arrangement.

Figures 5A, 5B:
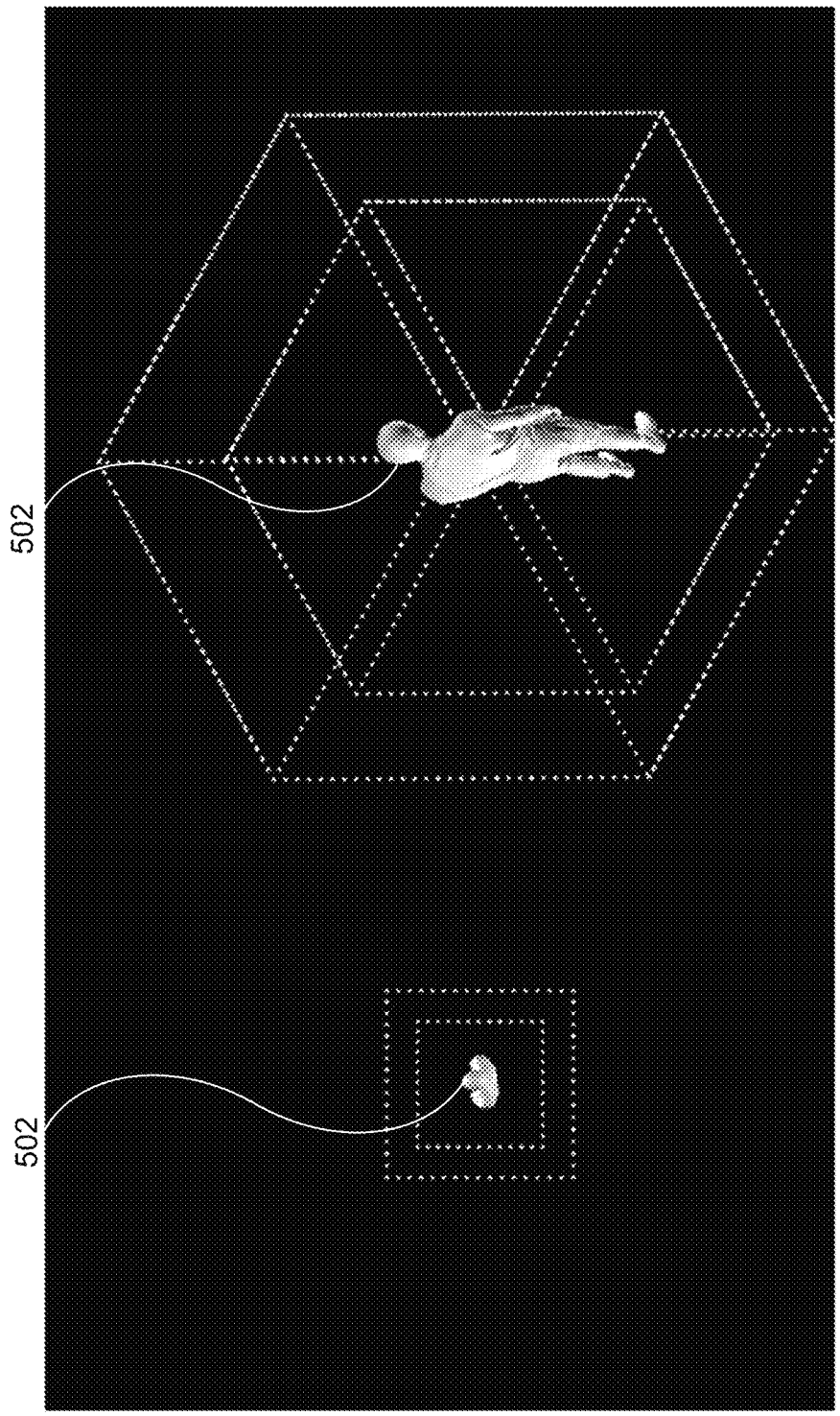

Referring now to FIGS. 5A and 5B, there is illustrated an example linear grid positioning arrangement for virtual displays within a virtual environment generated by the HMD 100. FIG. 5A illustrates the positioning arrangement from above, and FIG. 5B illustrates the positioning arrangement from an isometric view. In this positioning arrangement, virtual displays are arranged in layers at two depth levels and laid out around a user 502 in a cube. It is understood that any number of depth levels could be added to or removed from the cube.

Figures 6A, 6B:
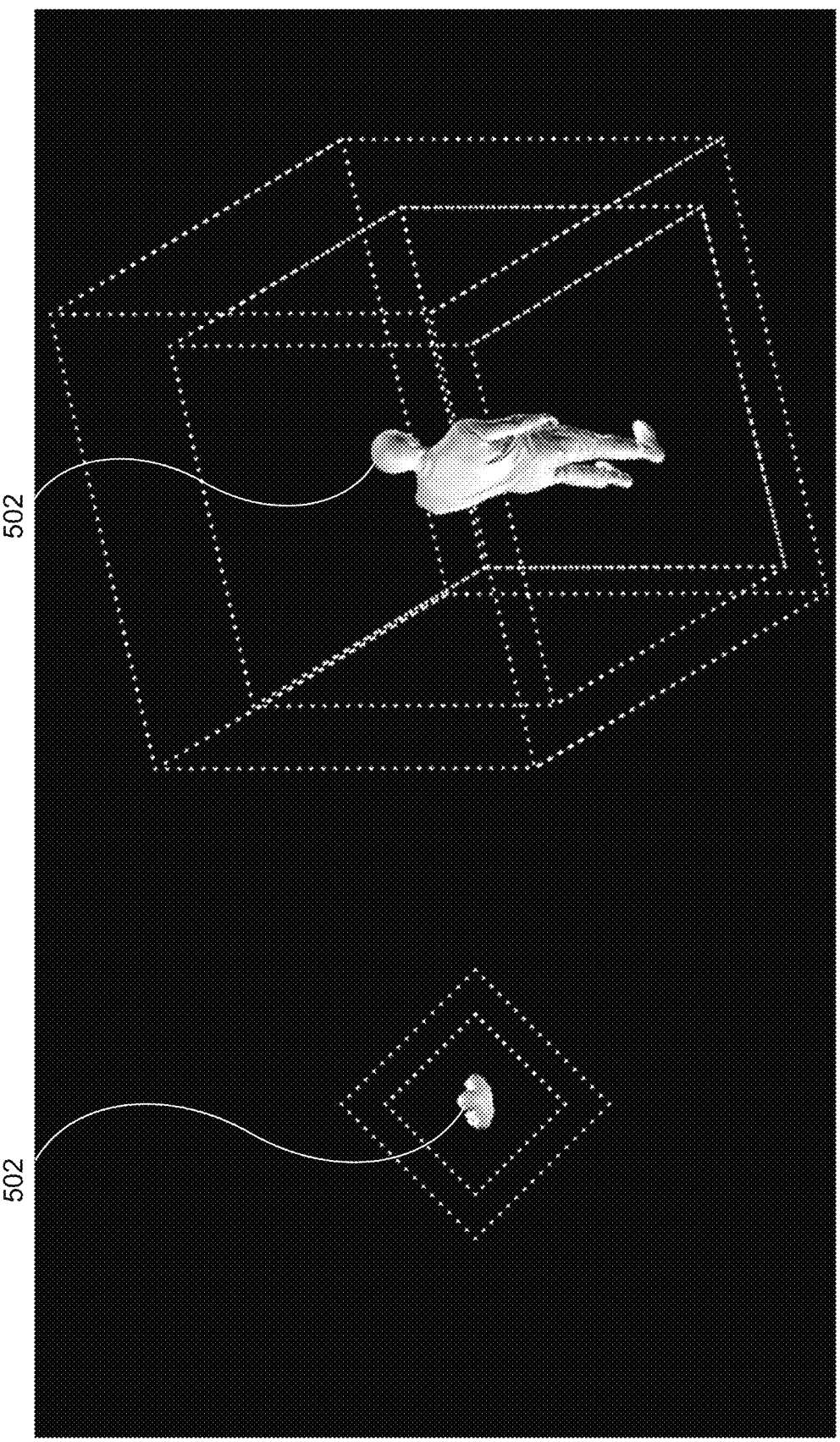

Referring now to FIGS. 6A and 6B, there is illustrated an example converging grid positioning arrangement for virtual displays within a virtual environment generated by the HMD 100. FIG. 6A illustrates the positioning arrangement from above, and FIG. 6B illustrates the positioning arrangement from an isometric view. In this positioning arrangement, virtual displays are arranged in layers at two depth levels and laid out around a user 502 in a cube that is rotated 45 degrees so that an edge of the cube is directly in front of the user. It is understood that any number of depth levels could be added to or removed from the cube.

Referring now to FIGS. 7A and 7B, there is illustrated an example circular grid positioning arrangement for virtual displays within a virtual environment generated by the HMD 100. FIG. 7A illustrates the positioning arrangement from above, and FIG. 7B illustrates the positioning arrangement from an isometric view. In this positioning arrangement, virtual displays are arranged in layers at two depth levels and laid out around a user 502 in a sphere. The virtual displays may be curved to match the curvature of the sphere. It is understood that any number of depth levels could be added to or removed from the sphere.

Referring now to FIGS. 8A and 8B, there is illustrated an example dome grid positioning arrangement for virtual displays within a virtual environment generated by the HMD 100. FIG. 8A illustrates the positioning arrangement from above, and FIG. 8B illustrates the positioning arrangement from an isometric view. In this positioning arrangement, virtual displays are arranged in layers at three depth levels and laid out around a user 502 in a dome. The virtual displays may be curved to match the curvature of the dome. It is understood that any number of depth levels could be added to or removed from the dome.

Figures 9A, 9B:
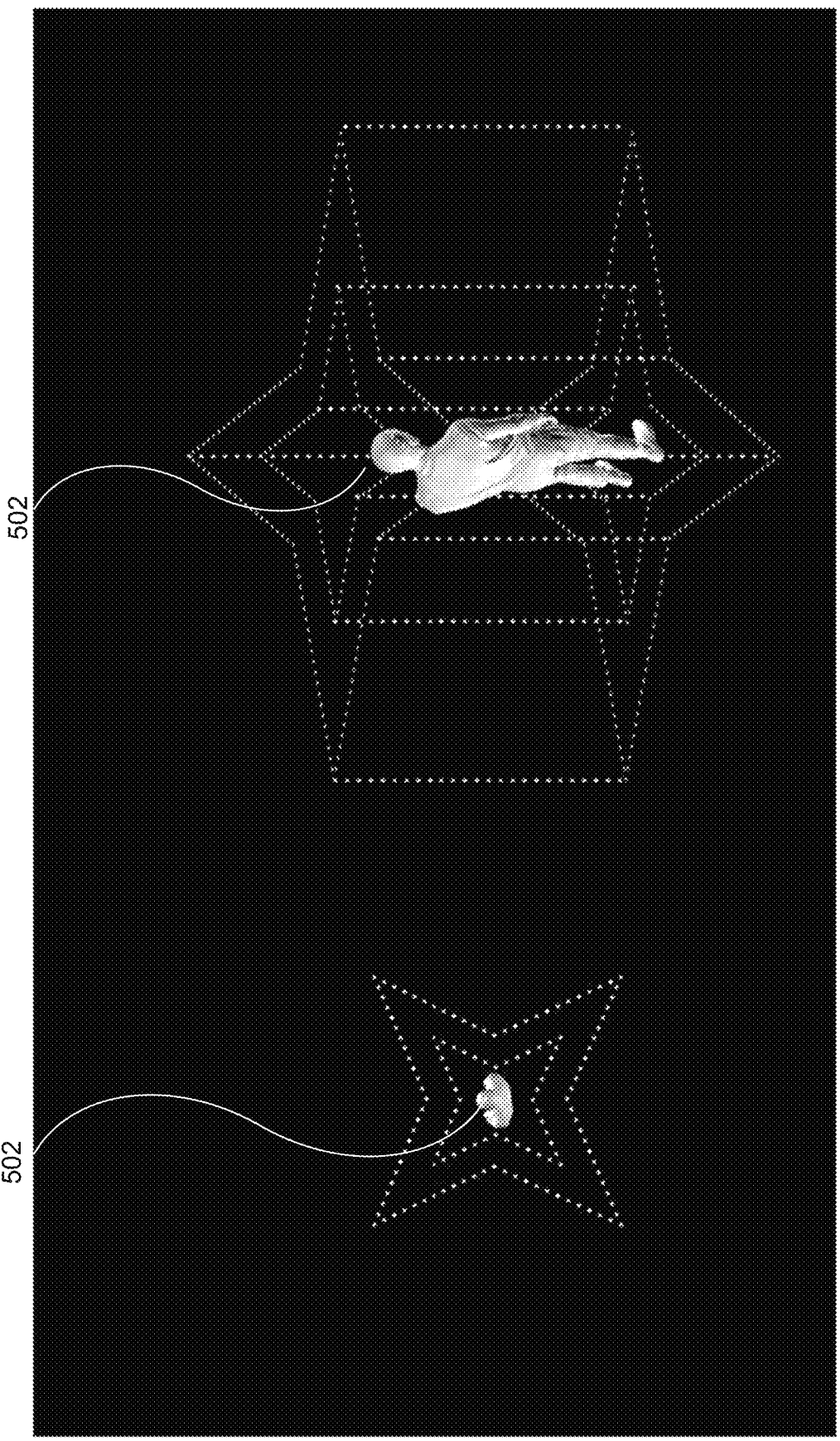

Referring now to FIGS. 9A and 9B, there is illustrated an example priority grid positioning arrangement for virtual displays within a virtual environment generated by the HMD 100. FIG. 9A illustrates the positioning arrangement from above, and FIG. 9B illustrates the positioning arrangement from an isometric view. In this positioning arrangement, virtual displays are arranged in layers at two depth levels and laid out around a user 502 in a four-pointed star. The virtual displays in this embodiment may be arranged such that a central vertical axis of each virtual display coincides with the plane of the four-pointed star, while each virtual display faces towards the user head-on. This could result in an arrangement where a prioritized virtual display is directly in front of the user (and directly on each side and directly behind the user), while a number of virtual displays arranged in order of descending priority are arranged behind and slightly to the side of the priority virtual display. It is understood that any number of depth levels could be added to or removed from the priority grid.

Figures 10A, 10B:
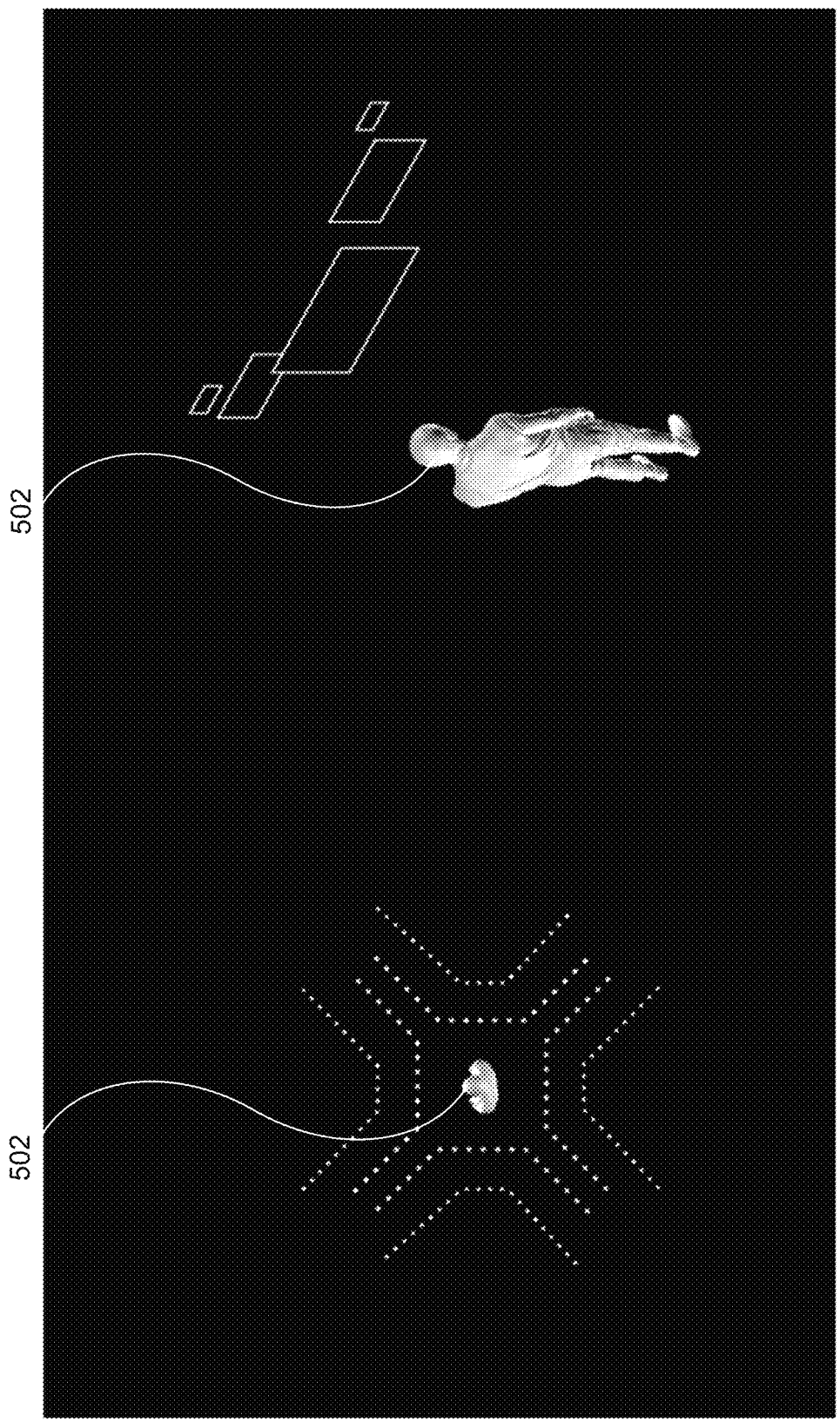

Referring now to FIGS. 10A and 10B, there is illustrated another example priority grid positioning arrangement for virtual displays within a virtual environment generated by the HMD 100. FIG. 10A illustrates the positioning arrangement from above, and FIG. 10B illustrates the positioning arrangement from an isometric view. This positioning arrangement is similar to that of FIGS. 9A and 9B, except that the four-pointed star shape is modified to have a flat area on each side of the user, and the corners of the four-pointed star extend into the distance rather than meeting at a point. In this embodiment, the virtual displays are arranged at two depth levels, but it is understood that any number of depth levels could be added to or removed from the priority grid.

Referring now to FIGS. 11A and 11B, there is illustrated an example walking grid positioning arrangement for virtual displays within a virtual environment generated by the HMD 100. FIG. 11A illustrates the positioning arrangement from above, and FIG. 11B illustrates the positioning arrangement from an isometric view. In this positioning arrangement, virtual displays are arranged in layers at two depth levels and laid out to the front and sides of a user 502 in a roughly semi-circular pattern. Similar to FIGS. 9A and 9B, the virtual displays in this embodiment may be arranged such that a central vertical axis of each virtual display coincides with the plane of the positioning arrangement, while each virtual display faces towards the user head-on. Alternatively the virtual displays may be aligned with the planes of the walking grid positioning arrangement to face the user at an angle as the walking grid wraps to the sides of the user. This positioning arrangement has a gap directly in front of the user so that no virtual displays will be placed directly in front of the user. This allows the user to see in front of them while they are moving. Again, it is understood that any number of depth levels could be added to or removed from the walking grid.

In the above examples of FIGS. 5A-11B, the positioning arrangements can be defined such that the closest layer is within arm's reach of the user 502, so that the user can interact with virtual displays in that layer by touch. The HMD 100 can recognize gestures at this distance as interaction with the virtual displays in that layer. In some embodiments, the HMD 100 can also recognize gestures outside of that layer for other purposes, such as to move virtual displays from more distant layers into a closer layer. Furthermore, the locations of the layers can be modified by the user 502.

Figure 12:
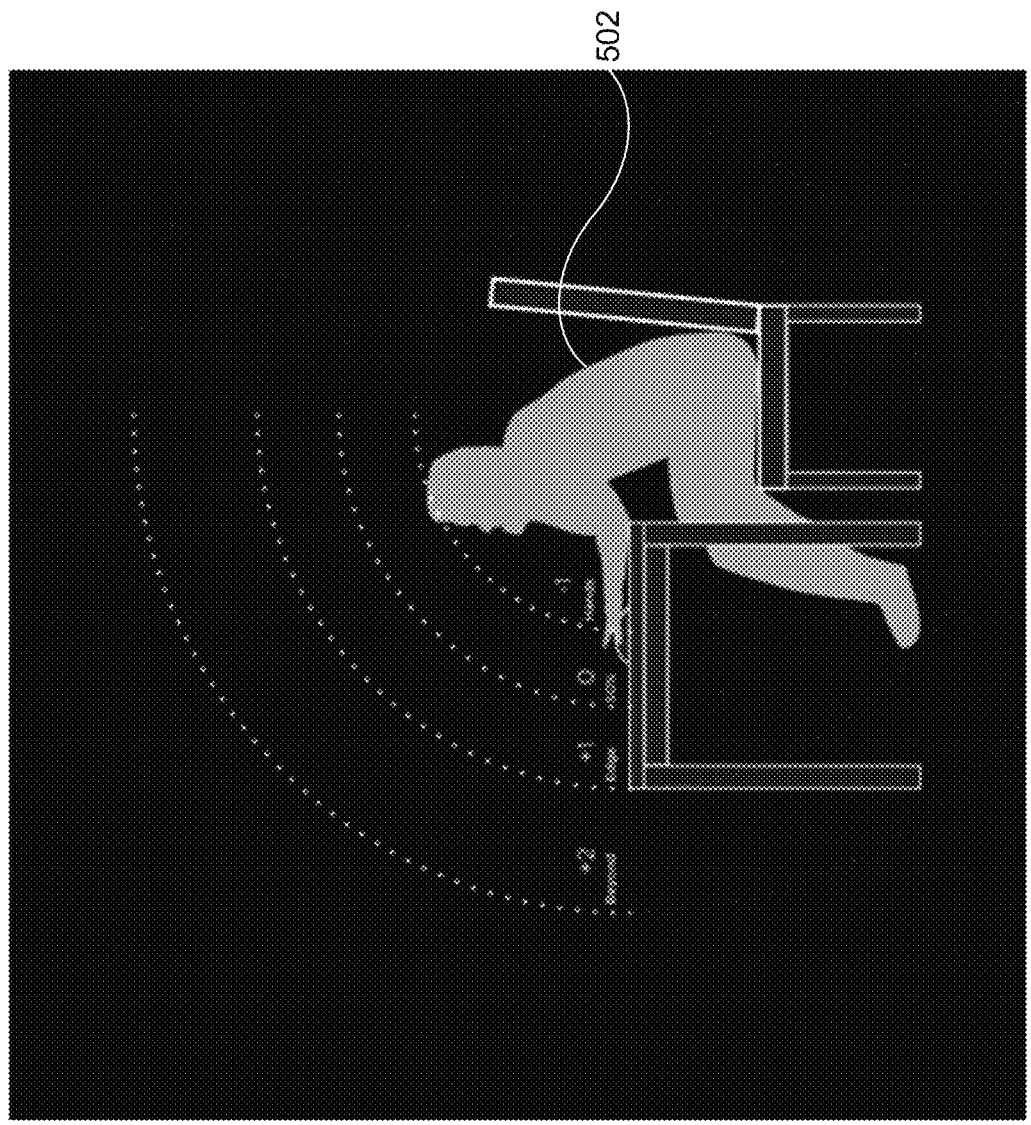

Referring now to FIG. 12, there is illustrated an example sitting grid positioning arrangement for virtual displays within a virtual environment generated by the HMD 100. The positioning arrangement is illustrated from a side view. In this positioning arrangement, virtual displays are arranged in layers at four depth levels, laid out in front of the user 502, and curving such that the virtual displays will still face the user directly as the user looks up. This embodiment can, for example, be used for a seated workstation.

In some embodiments, the −1 layer is roughly placed at the depth that the user's hands are at when using a mouse and keyboard as input devices. This layer could be reserved for display of notifications, and the user could interact with these notifications using gestures. The +1 layer could be the default layer used for display of virtual displays that are being actively used for tasks, and the +2 layer could be used to contain currently inactive virtual displays (i.e., virtual displays that are not in focus by the user). The 0 layer could contain virtual displays that have interaction controls with which the user can interact with gestures (e.g., pressing a virtual button, swiping a virtual slider, etc. that are displayed in the 0 layer). In other embodiments, the HMD 100 recognizes gestures made within the 0 layer but does not display any virtual displays in that layer. In some embodiments, certain gestures are recognized as inputs only at certain depth layers. In some implementations, the +1 layer can be approximately placed at an edge of a table on which the user's hands are placed when using the mouse and keyboard as input devices, the 0 layer can be approximately placed halfway (50%) between the +1 layer and the −1 layer, and the +2 layer can be approximately placed beyond the edge of the table. Many variations are possible.

Figures 13A, 13B:
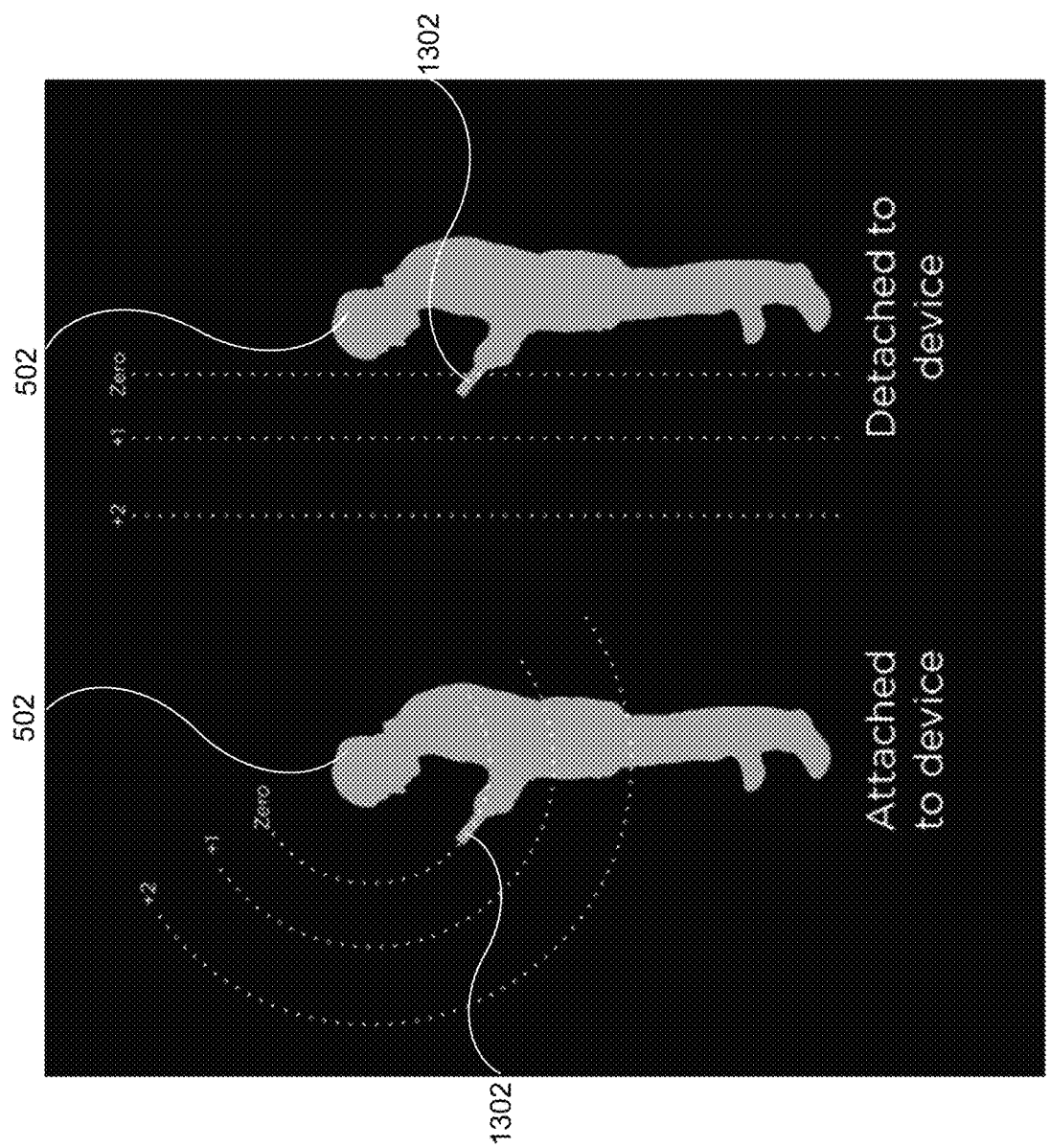

Referring now to FIGS. 13A and 13B, there are illustrated example standing grid positioning arrangements for virtual displays within a virtual environment generated by the HMD 100. The positioning arrangements are illustrated from a side view. These embodiments can, for example, be used for a standing workstation. In the examples of FIGS. 13A and 13B, the virtual displays are associated with a mobile device 1302—for example, the virtual displays could display applications, notifications, or the like that are executed on the mobile device 1302. In these positioning arrangements, virtual displays are arranged in layers at three depth levels, laid out in front of the user 502. In the example of FIG. 13A, the layers are "attached" to the mobile device 1302 and arranged to curve such that virtual displays in these layers will still face the user directly as the user looks up or down. As the layers are attached to the mobile device 1302, the positioning of the layers will move along with the mobile device, as will any virtual displays attached to the layers. In the example of FIG. 13B, the virtual displays are not attached to the mobile device 1302, but instead stay at a constant distance relative to the user even if the mobile device 1302 is moved.

In some embodiments, the zero layer is roughly placed at the depth of a mobile device 1302 held by the user 502. The HMD 100 could recognize gestures as inputs in the zero layer, as well as using inputs made by physical interaction with the mobile device 1302 (e.g., via a touch screen or via hardware buttons on the mobile device 1302). Virtual displays containing input prompts (e.g., buttons, sliders, or the like) could also be displayed in the zero layer, and the HMD 100 could recognize user interaction with these prompts as inputs. The +1 layer and +2 layer are placed slightly further away from the zero layer, and could be configured by the user to a comfortable viewing distance. The +1 layer could be the default layer used for display of virtual displays that are being actively used for tasks, and the +2 layer could be used to contain currently inactive virtual displays (i.e., virtual displays that are not in focus by the user).

Figure 14:
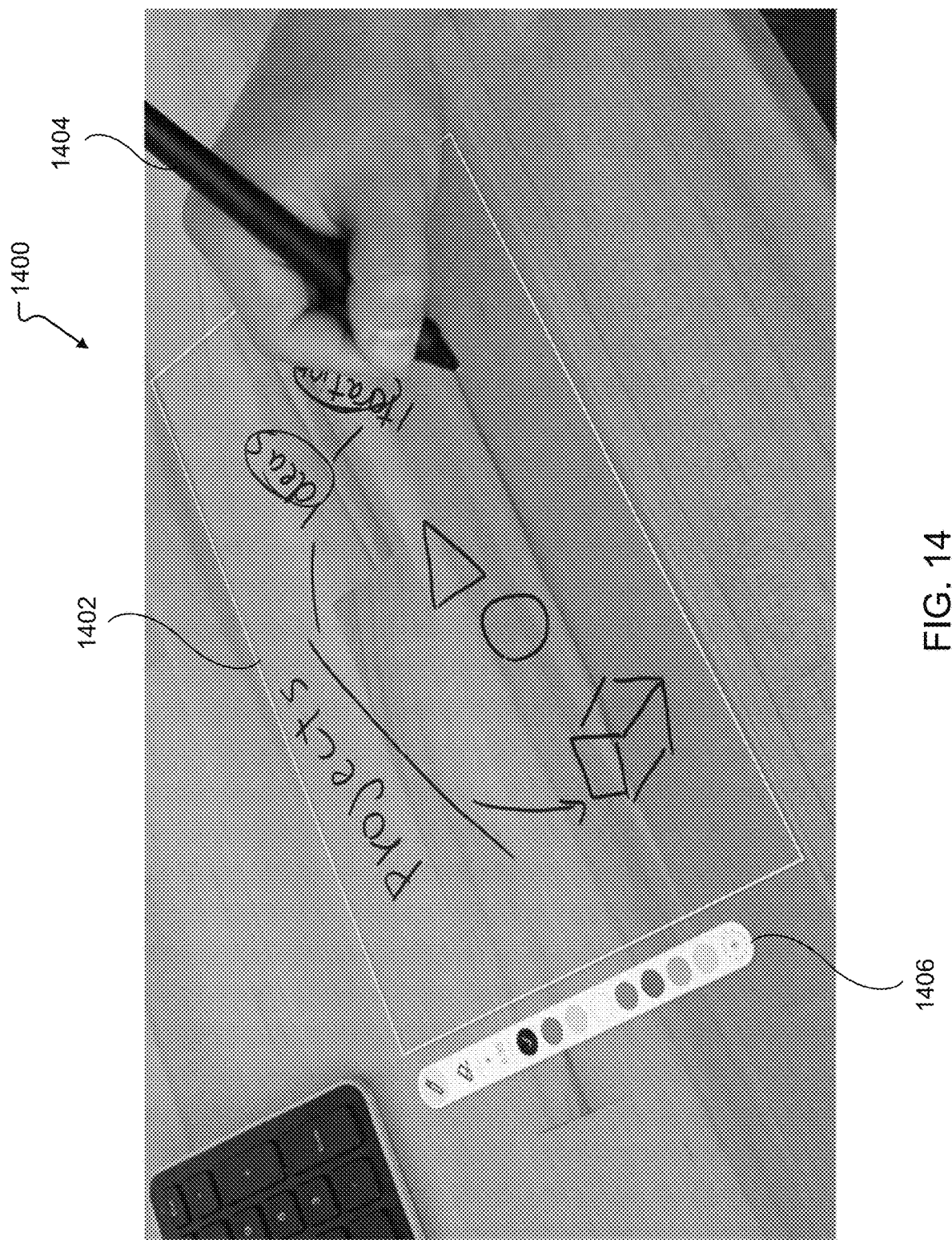
FIG. 14 illustrates an example virtual environment of the HMD according to illustrative embodiments of the present disclosure.

FIG. 14 illustrates an example virtual environment 1400 of the HMD 100 according to illustrative embodiments of the present disclosure. In some embodiments, the virtual environment 1400 is the same as the virtual environments 200, 300, or 400, with a focus on a workspace surface within a physical environment that is in view of the user. It is understood that any suitable electronic device could perform at least some portion of the functions of the HMD 100 described below.

In this embodiment, the HMD 100 displays a virtual display 1402 such that it appears to be lying flat on a physical workspace surface in front of the user. This can be useful for tasks that involve drawing. For example, a user can use a tool such as a drawing stylus 1404 to draw on the virtual display 1402, and the HMD 100 can recognize that action as an input and modify the contents of the virtual display 1402 accordingly. The drawing stylus 1404 could be an active electronic device that communicates with the HMD 100 directly, or could be a passive object that the HMD 100 tracks using image recognition (i.e., image analysis, object recognition, etc.). In some embodiments, the drawing stylus 1404 could be interfaced with a separate electronic device such as a computer or mobile device, and the separate electronic device in turn relays information from the drawing stylus 1404 to the HMD 100. In some embodiments, additional interface controls 1406 are displayed alongside the virtual display 1402, or as part of the virtual display 1402. Actuation of these interface controls 1406 can be accomplished with the drawing stylus 1404, with a gesture, with a remote control, or in any other suitable manner.

Figure 15:
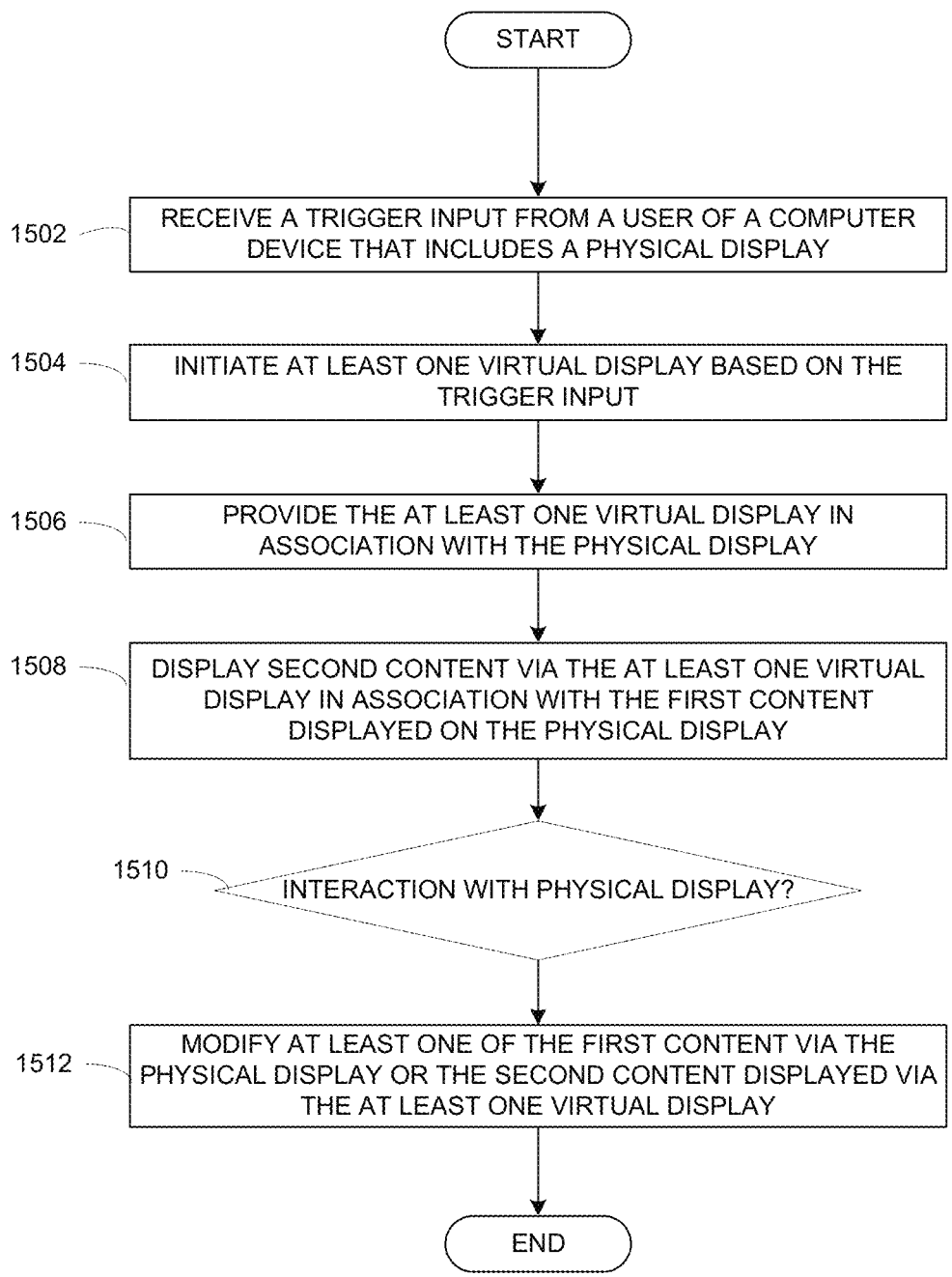
FIG. 15 illustrates an example method for displaying and controlling virtual displays in a virtual environment in accordance with various embodiments of the present disclosure.

FIG. 15 illustrates an example method for displaying and controlling virtual displays (or virtual displays) in a virtual environment in accordance with various embodiments of the present disclosure. In some embodiments, the method of FIG. 15 may be performed by the HMD 100.

The method begins with the HMD 100 receiving a trigger input from a user of a computing device (or electronic device) at step 1502. The computing device includes a physical display that displays first content. In some embodiments, the computing device is a mobile device such as a smart phone. In other embodiments, the computing device is a desktop or laptop computer. The trigger input can include a gesture, an interaction (such as a touch interaction with a touch sensitive physical display), actuation of a hardware button, or an instruction (such as a voice command) by the user.

Next, the HMD 100 initiates at least one virtual display based on the trigger input from the user at step 1504, and provides the at least one virtual display in the virtual environment in association with the physical display at step 1506. For example, the HMD 100 could generate content for display in a virtual display based on a user input that requests display of a particular first content on the physical display, or based on a user input that directly requests the initiation of the virtual display.

The virtual display can be provided, in some embodiments, in a location in the virtual environment that is adjacent to the physical display, or in another predetermined location that is determined relative to the physical display. This can include functionally extending the physical display using the at least one virtual display, for example by providing the virtual display directly adjacent to the physical display so that it appears to the user as a direct extension of the physical display. In some embodiments, the HMD 100 also determines an input source that can be the source of the trigger, a source of interaction with the physical display, or a source of interaction with the virtual display.

The HMD 100 then, at step 1508, displays second content via the at least one virtual display in association with the first content displayed via the physical display. In some embodiments, the first content is a first portion of an object, and the second content is a second portion of the object, and the two portions appear as one object across the physical and virtual displays. In other embodiments, the first content includes a 2D object and the second content includes a 3D representation of the 2D object.

The HMD 100, at decision step 1510, determines whether an interaction is performed by the user with respect to the physical display. This could include, for example, a touch input on the physical display when the physical display is touch-sensitive, a gesture input over the physical display that is recognized by the HMD 100 using image recognition, or any other suitable interaction. At step 1512, in response to the interaction, and based on what the interaction was, the HMD 100 modifies at least one of the first content displayed via the physical display or the second content displayed via the at least one virtual display.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A computer-implemented method comprising:
  receiving a trigger input from a user of a computing device, the computing device including a first physical display that displays first content;
  initiating at least one virtual display via a second physical display of a head mountable device (HMD) based on the trigger input from the user;
  providing the at least one virtual display in association with the first physical display; and
  displaying second content via the at least one virtual display in association with the first content displayed via the first physical display.

2. The method of claim 1, further comprising:
  determining that an interaction is performed by the user with respect to the first physical display; and
  modifying, based on the interaction, at least one of the first content displayed via the first physical display or the second content displayed via the at least one virtual display.

3. The method of claim 1, wherein the trigger input includes at least one of a gesture, an interaction, or an instruction by the user.

4. The method of claim 1, wherein providing the at least one virtual display in association with the first physical display includes extending the first physical display with the at least one virtual display.

5. The method of claim 1, wherein displaying the second content via the at least one virtual display in association with the first content displayed via the first physical display includes displaying the first content including a first portion of an object and displaying the second content including a second portion of the object, wherein the second portion of the object is displayed to appear to connect to the first portion of the object.

6. The method of claim 1, wherein displaying the second content via the at least one virtual display includes displaying a three-dimensional (3D) object that corresponds to a two-dimensional (2D) object that is included in the first content displayed via the first physical display.

7. The method of claim 1, further comprising determining an input source to interface with the at least one virtual display.

8. A head mountable device (HMD) comprising:
  a first physical display; and
  a processor operatively coupled to the first physical display and configured to:
    receive a trigger input from a user of a computing device, the computing device including a second physical display that displays first content;
    initiate at least one virtual display based on the trigger input from the user;

provide, with the first physical display, the at least one virtual display in association with the second physical display; and display, with the first physical display, second content via the at least one virtual display in association with the first content displayed via the second physical display.

9. The HMD of claim 8, wherein the processor is further configured to:

determine that an interaction is performed by the user with respect to the second physical display; and modify, based on the interaction, at least one of the first content displayed via the second physical display or the second content displayed via the at least one virtual display.

10. The HMD of claim 8, wherein the trigger input includes at least one of a gesture, an interaction, or an instruction by the user.

11. The HMD of claim 8, wherein the processor is further configured to provide the at least one virtual display in association with the second physical display by extending the second physical display with the at least one virtual display.

12. The HMD of claim 8, wherein the processor is further configured to display the second content via the at least one virtual display in association with the first content displayed via the second physical display by displaying the first content including a first portion of an object and displaying the second content including a second portion of the object, wherein the second portion of the object is displayed to appear to connect to the first portion of the object.

13. The HMD of claim 8, wherein the processor is further configured to display the second content via the at least one virtual display by displaying a three-dimensional (3D) object that corresponds to a two-dimensional (2D) object that is included in the first content displayed via the second physical display.

14. The HMD of claim 8, wherein the processor is further configured to determine an input source to interface with the at least one virtual display.

15. A non-transitory computer readable medium embodying a computer program, the computer program comprising computer readable program code that when executed causes at least one processing device to:

receive a trigger input from a user of a computing device, the computing device including a first physical display that displays first content;

initiate at least one virtual display via a second physical display of a head mountable device (HMD) based on the trigger input from the user;

provide, with the second physical display, the at least one virtual display in association with the first physical display; and display, with the second physical display, second content via the at least one virtual display in association with the first content displayed via the first physical display.

16. The non-transitory computer readable medium of claim 15, wherein the computer readable program code when executed causes the at least one processing device to determine that an interaction is performed by the user with respect to the first physical display; and modify, based on the interaction, at least one of the first content displayed via the first physical display or the second content displayed via the at least one virtual display.

17. The non-transitory computer readable medium of claim 15, wherein the trigger input includes at least one of a gesture, an interaction, or an instruction by the user.

18. The non-transitory computer readable medium of claim 15, wherein the computer readable program code when executed causes the at least one processing device to provide the at least one virtual display in association with the first physical display by extending the first physical display with the at least one virtual display.

19. The non-transitory computer readable medium of claim 15, wherein the computer readable program code when executed causes the at least one processing device to display the second content via the at least one virtual display in association with the first content displayed via the first physical display by displaying the first content including a first portion of an object and displaying the second content including a second portion of the object, wherein the second portion of the object is displayed to appear to connect to the first portion of the object.

20. The non-transitory computer readable medium of claim 15, wherein the computer readable program code when executed causes the at least one processing device to display the second content via the at least one virtual display by displaying a three-dimensional (3D) object that corresponds to a two-dimensional (2D) object that is included in the first content displayed via the first physical display.

* * * * *